Patented Dec. 5, 1939

2,182,073

UNITED STATES PATENT OFFICE 2,182,073

HORMONE

Wilhelm Dirscherl, Frankfort-on-the-Main, Germany, assignor to Rare Chemicals, Inc., Nepara Park, N. Y., a corporation of New York No Drawing. Application August 12, 1936, Serial No. 95,713. In Switzerland August 16, 1935

2 Claims. (Cl. 167—74)

This invention relates to hormones and particularly to male acting hormones.

I have discovered that substances having characteristics of male acting hormones are present in wax-like raw materials obtained from barks of trees containing unsaturated alcohols of sterol type of the group consisting of cinchol, cupreol, quebrachol and rhamnol. Such a raw material is, e. g., China wax (cincho cerotin).

These hormones differ from the known male acting hormones in that they do not substantially influence the growth of a capon's comb, but show a considerable activity in the seminal vesicle test of Loewe and Voss (Klinische Wochenschrift, 1930, vol. 9, p. 481).

The other known hormone preparations of male activity either do not show this activity on the seminal vesicle at all, or if they do, only in combination with a strong activity on the capon's comb.

This invention, therefore, has for its salient object to obtain or derive a new male acting sexual hormone from raw materials obtained from barks of trees containing unsaturated alcohols of sterol type of the group consisting of cinchol, cupreol, quebrachol and rhamnol or of the said sterol like alcohols.

Another object of the invention is to provide a method of deriving or extracting male acting hormones from the said raw materials or from the alcohols contained therein.

Further objects of the invention will appear from the following specification.

The invention briefly described consists of a new product, namely, a new male acting sexual hormone showing a considerable activity on the seminal vesicle derived from the above named materials, but having substantially no activity on a capon's comb.

The invention further consists of a method of extracting or deriving the new male acting hormone from the materials mentioned by the use of solvents and purifying the extracts with other physical and chemical methods. Suitable solvents are aqueous and nonaqueous liquids. Suitable aqueous liquids are: water, aqueous solutions of inorganic or organic bases, especially weak bases, aqueous solutions of inorganic or organic acids, especially weak acids, aqueous solutions of inorganic or organic salts, further aqueous solutions of organic solvents soluble in water, as dioxane and alcohols, e. g., methanol, ethanol, propanol, glycol, glycerol. As nonaqueous liquids may be used: liquids soluble in water as anhydrous alcohols and liquids not soluble in water as benzene. When working at higher temperatures it is suitable to use anhydrous or substantially anhydrous alcohols; on cooling most of the active substance is precipitated. When working with an extracting product not soluble in water, the active material is suitably extracted therefrom by means of an aqueous liquid as, e. g., water or dilute alcohol.

The extracts thus obtained may be freed from solvent by distillation. On dissolving a second time and precipitating with a suitable organic liquid, furthermore on treating with ketone reagents and following decomposition of the addition compounds thus formed, a further concentration of the active substance may be attained.

The extraction may be carried out cold as well as by an elevated temperature. When working in the cold the use of stirring or kneading equipment is necessary to obtain a complete extraction. To obtain a thorough mixing and complete extraction the addition of an emulsifying agent is helpful. When working at a higher temperature a thorough mixing of the material to be extracted with the extracting medium is occomplished with a stirring or shaking apparatus.

To find out the most efficient kind of extracting from raw materials or from sterols it is advisable to prove the hormone content of the initial material by means of the seminal vesicle test. It is also suitable to verify the course of extraction and of enrichment of the active substance by the same method. In an analogous manner may be proved the separation from other hormones simultaneously present and for the concentration, purification and standardization of the final solutions and of the solid products obtained therefrom.

With these substances the seminal vescile unit is generally contained in 100γ, in some cases also in less than 100γ.

The following are examples of satisfactory methods or modes of procedure:

*Example 1.*—5 gms. China wax (cincho cerotin) are dissolved in one liter benzene. The solution, after the small amount of undissolved particles have been removed by filtration, is shaken out with water. The aqueous layer is separated preferably with a centrifuge, and evaporated to dryness. The residue is dissolved in alcohol, separated by filtration from small quantities of undissolved particles and again evaporated to dryness. While the original material in amount of 5 mgms. has almost no activity in the seminal vesicle test, the substance obtained from the aqueous solution has an activity of one M. U. in 80–100γ.

*Example 2.*—In an analogous manner as described in Example 1 a male acting substance is obtained by extracting cuperol with dilute alcohol in the warmth.

Although the invention has been described in considerable detail and methods by which the hormones may be extracted or derived have been given, it should be understood that no limitations are intended other than those imposed by the appended claims.

What I claim is:

1. A male acting sexual hormone comprising an extract of a wax-like raw material obtained from tree barks containing a sterol type alcohol of the group consisting of cinchol, cupreol, quebrachol and rhamnol, said extract having specific activity on the seminal vesicle of the mouse equal to one M. U. in not more than $100\gamma$ when tested according to Loewe and Voss, but having substantially no activity upon a capon's comb.

2. A male acting sexual hormone comprising an extract of China wax (cincho cerotin) said extract having specific activity on the seminal vesicle of the mouse equal to one M. U. in not more than $100\gamma$ when tested according to Loewe and Voss, but having substantially no activity upon a capon's comb.

WILHELM DIRSCHERL.